# 3,032,573
NICKEL-CARBONYL-ORGANOPHOSPHINES

Lewis S. Meriwether, Norwalk, and Marilyn L. Fiene, Stamford, Conn., assignors to American Cyanamid Company, New York, N.Y., a corporation of Maine
No Drawing. Filed Nov. 17, 1958, Ser. No. 774,150
9 Claims. (Cl. 260—439)

This invention relates to new chemical compounds and a method of using them. More particularly the invention relates to a new series of nickel-carbonyl-phosphine catalysts which can be used for the production of polymers of acetylene. This series of catalyst complexes includes both chelated and nonchelated forms of nickel-carbonyl complexes with cyanoethyl-substituted phosphines. The invention further includes all nickel-carbonyl-phosphine catalysts in the chelated form.

The complexes represented by the formula $$Ni(CO)_2(FR_3)_2 \quad (I)$$

and $Ni(CO)_2(R_2PYPR_2)$ (II) where R represents at least one member selected from the class consisting of alkyl, aryl, aralkyl, alkaryl, alkoxy, aryloxy, cyanoalkyl, carboalkoxyalkyl, carbamoylalkyl or any other substituent on the phosphorus, Y represents a member selected from the class consisting of ethylene, trimethylene and orthophenylene groups, function with different degrees of activity in the polymerization of acetylenes to form aromatic and linear polymers. This activity was found generally to increase with increasing relative electronegativity of the R substituent or decreasing basicity of the phosphine group. The relative activity is particularly manifested in the preparation of linear polymers such as those disclosed and claimed in copending application, Serial No. 774,152, now U.S. Patent No. 2,961,330, issued November 22, 1960, filed concurrently herewith. Three factors were taken into consideration for roughly determining the effect of the various R substituents on the relative activities of the catalysts: (1) the induction period, i.e., the time during which all of the reactants are together and under suitable reacting conditions before any reaction is noted; (2) percentage of final conversion of monomers; and (3) the total period of time elapsed to reach a certain percentage conversion of monomers. From this investigation a series of new complexes was developed having the general formula $Ni(CO)_{4-n}[PX_2(C_2H_4CN)]_n$ (III) where $n$ represents a whole number from 1 to 2 inclusive, and X represents a member of the class consisting of hydrogen and the radical —$C_2H_4CN$, all of which prove to react catalytically in the polymerization of acetylenes; the $P(C_2H_4CN)_3$ and $PH(C_2H_4CN)_2$ substituted complexes give better results than any heretofore known nickel-carbonyl-phosphine catalysts.

The prior art teachings of the use of these nickel-carbonyl-phosphine catalysts is sketchy and relies purely upon empirical results. [See Kleinschmidt, U.S. Patent 2,542,417, McKeever et al., U.S. Patent 2,542,551, Reed, J. Chem. Soc., 1931 (1954), and Reppe et al., Annalen, 560, 104 (1948)]: None of the prior art, including the above articles or patents, goes any further than teaching that the triphenyl-substituted phosphine-nickel-dicarbonyl is the most active of the phosphine-substituted nickel-carbonyl catalysts heretofore used in acetylene aromatization. Furthermore, the formation of chelated-type catalysts is nowhere contemplated by the prior art. Not only is the use of chelated complexes of diphosphines with nickel carbonyl as catalysts new, but these chelated complexes are new in themselves.

The unexpected utility of chelated nickel-carbonyl-phosphine complexes as catalysts stems from the fact that the relative catalytic activity of such compounds has been found to be mainly a function of the nature of the R group substituted on the phosphine radical. The nature of the R group thus determines the basicity of the phosphine radical. This finding then led to the surprising discovery that the catalytic activity of these chelated complexes is substantially the same as that of the non-chelated complexes having the same substituents on the phosphine radical. These chelated complexes have proved to be desirable catalysts since they are more stable by their nature than non-chelated complexes and manifest little if any sacrifice in catalytic activity.

These chelated complexes as represented by Formula II are considered to have the following structure:

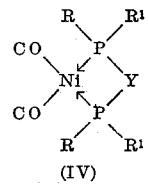

(IV)

Further application of the principle, the nature of the R substituent substantially determines the activity of these nickel-carbonyl-phosphine catalysts, to non-chelated catalysts opens the door to many new complexes which are limited only by the availability of the free phosphine compounds. Of the phosphines contemplated, the cyanoethyl-substituted phosphines which are disclosed in U.S. patent to Hechenbleickner et al., 2,822,376, proved to form better catalysts than any previously examined phosphines when complexed with nickel carbonyl. This result is significant since the cyanoethyl-substituted phosphines are less basic than the previously used triphenylphosphine. Both the tris- and bis-2-cyanoethylphosphine-substituted catalysts have an induction period of one-third the previously known triphenylphosphine-substituted catalysts with almost twice the efficiency of reaction in the polymerization of heptyne-1.

These nickel-carbonyl-phosphine catalysts may be prepared in situ in the presence of the acetylene to be polymerized or may be prepared beforehand and then entered into the reaction mixture. However, these nickel-carbonyl-phosphine catalysts, including the chelated forms, are usually prepared by refluxing the substituted phosphine with nickel carbonyl in a solvent such as ether or methanol.

The preparation of the nickel-carbonyl-phosphine catalysts is simple and require no unusual equipment.

As stated above the patent to Heckenbleickner discloses a process for the preparation of the cyanoethyl phosphines which are to be used in the preparation of the $$Ni(CO)_{4-n}[(C_2H_4CNPX_2)]_n$$

complexes. A specific preparation of these source compounds is given in the following example.

EXAMPLE 1

79.5 parts (1.5 moles) of acrylonitrile are dissolved in 150 parts of acetonitrile containing 20 parts of Dowex 2 which may be generally represented as:

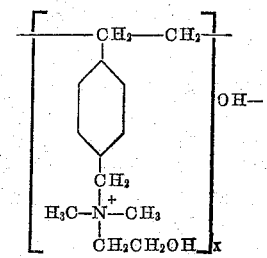

where $x$ is about 5000. The mixture is charged slowly to a suitable reactor to which is gradually added phosphine over a period of two hours and thirty minutes. The reaction temperature is maintained at 45° C.–50° C. The amount of phosphine absorbed is about 0.8 mole during reaction.

The contents in the reaction vessel are next filtered and the filtrate vacuum distilled. The yields of mono, bis- and tris (2-cyanoethyl) phosphine recovered are 5%, 44% and 25%, respectively.

The source of the diphosphines which are used in the preparation of the chelated complexes is dependent upon the chosen diphosphine. Generally, most of the diphosphines may be prepared by forming the sodium derivative of a diphosphine in liquid ammonia and subsequently reacting this derivative with an alkylene dihalide such as ethylene dibromide. This procedure is more fully disclosed by Hitchcock et al., J.C.S. 2081 (1958). However, it has been found that when the phosphine is to include cyanoalkyl, carboalkoxyalkyl or carbamoyl groups the above method can not be used because of an interference with the expected reaction; and only the method employed by Grayson in copending application S.N. 774,157, filed concurrently herewith, will enable these phosphines to be prepared. The following examples exemplify the different route taken to prepare phosphines with the interfering groups.

EXAMPLE 2

Tetrakis(2-Cyanoethyl)Ethylenediphosphine (NCCH$_2$CH$_2$)$_2$P—CH$_2$CH$_2$—P—(CH$_2$CH$_2$CN)$_2$ Tris(2-cyanoethyl)phosphine (144.9 grams, 0.75 mole) was dissolved in 400 milliliters of refluxing n-butanol. When solution was complete, 62.7 grams (0.33 mole) of 1,2-dibromoethane was added slowly with stirring and refluxing. The mixture was heated for a total of twenty-four hours and then filtered while hot. The white, crystalline phosphonium salt which had precipitated out during refluxing was collected, dried and then recrystallized from acetonitrile (M.P. >300° C.). Calculated for P$_2$N$_6$Br$_2$C$_{20}$H$_{28}$: Br, 27.82. Found: Br, 26.41.

Metallic sodium (4.6 grams, 0.2 gram-atom) was reacted with 250 milliliters of absolute ethanol and cooled to 25° C. Fifty-eight grams (0.1 mole) of 1,2-ethane-bis[tris(2-cyanoethyl)]phosphonium bromide was added to the sodium ethoxide solution and the mixture was heated to reflux and refluxed for two hours. At the end of this time the reaction mixture was concentrated and cooled. The tetrakis(2-cyanoethyl)ethylenediphosphine separated out as a granular solid. It was recrystallized from aqueous acetone and had a melting point at 101–102° C. Calculated for P$_2$N$_4$C$_{14}$H$_{20}$: C, 54.90; H, 6.58; N, 18.29; P, 20.23. Found: C, 54.71; H, 6.66; N, 18.32; P, 20.32

EXAMPLE 3

Tetrakis(2-Cyanoethyl)Trimethylenediphosphine (NCCH$_2$CH$_2$)$_2$P—CH$_2$—CH$_2$
—CH$_2$—P—(CH$_2$CH$_2$CN)$_2$ The phosphonium salt, 1,3-propanebis[tris(2-cyanoethyl)]-phosphonium bromide was prepared as described in Example 1, using 130.7 grams (0.68 mole) of tris(2-cyanoethyl)phosphine and 60.6 grams (0.30 mole) of 1,3-dibromopropane. The phosphonium salt was obtained as a white crystalline solid melting at 83–85° C. Calculated for P$_2$N$_6$Br$_2$C$_{21}$H$_{30}$: Br, 27.16. Found: Br, 24.89.

This phosphonium salt was reacted as in Example 1 with 6.7 grams (0.292 gram-atom) of sodium. The resulting crystalline tetrakis(2-cyanoethyl)trimethylene diphosphine was recrystallized from aqueous acetic acid (M.P., 66 to 70° C.). Calculated for P$_2$N$_4$C$_{15}$H$_{22}$: C, 56.24; H, 6.93; N, 17.49; P, 19.34. Found: C, 56.21; H, 7.02; N, 17.24; P, 19.26.

EXAMPLE 4

The ortho-phenylenebis-dialkylphosphines are generally prepared by reacting 1 mole of the ortho-bromoiodoaromatic compound with 2 moles of magnesium and treating the digrignard reagent thus formed with 2 moles of R$_2$PCl. This reaction is more completely presented by Hart et al. in J.C.S. 3939 (1957).

Other dicarbonyl-diphosphine-nickel complexes, for example, dicarbonylbis(diphenylethylphosphine)nickel, dicarbonylbis(diethylphenylphosphine)nickel, dicarbonylbis(tribenzylphosphine)nickel, dicarbonylbis(tritolylphosphine)nickel, dicarbonylbis(triethylphosphite)nickel, dicarbonylbis(triphenylphosphite)nickel, dicarbonylbis-[tris(2-carboethyoxyethyl)phosphine]nickel, and dicarbonylbis[tris(2-carbamoylethyl)phosphine]nickel are prepared by reacting two equivalents of the trivalent phosphorus compound with one equivalent of nickel carbonyl in refluxing ether or methanol by a procedure identical to that for the preparation of dicarbonyl bis[tris(2-cyanoethyl)phosphine]-nickel.

The preparation of dicarbonylbis[tris(2-cyanoethyl)-phosphine]nickel is typical of the preparation of the above mentioned compounds.

EXAMPLE 5

Tris(2-cyanoethyl)phosphine, as 11.6 g. (0.06 mole), in 100 ml. of methanol was brought to reflux and 3.9 ml. (0.03 mole) of nickel carbonyl in 50 ml. of methanol was slowly added. Carbon monoxide was evolved and crystals were deposited from the solution as refluxing was continued for one hour. The mixture was cooled and filtered and the complex was obtained as a white crystalline solid (12.5 g., 83%), M.P. 140° C. (decomp.). The complex is very soluble in the acetonitrile, slightly soluble in methanol, and insoluble in ethanol, benzene, and cyclohexane. The infrared spectrum contained bands in the metal carbonyl region at 2000 and 1938 cm.$^{-1}$ (Nujol mull). Analysis.—Calcd. for C$_{20}$H$_{24}$O$_2$N$_6$P$_2$Ni: C, 47.93; H, 4.83; N, 16.77; P, 12.37; Ni, 11.7. Found: C, 48.03; H, 4.94; N, 16.31; P, 12.54; Ni, 11.3.

The following examples are illustrative of the preparation of the chelated complexes.

EXAMPLE 6

A solution of 5.0 g. of tetraethylethylenediphosphine in 15 ml. of ether was added dropwise under a nitrogen atmosphere to a refluxing solution of 3.5 ml. of nickel carbonyl in 30 ml. of ether. The mixture was refluxed for an additional 30 minutes after all the diphosphine had been added. The ether was removed under water-pump vacuum yielding dicarbonyltetraethylethylenediphosphine-nickel as a viscous yellow oil. The complex had infra-red carbonyl bands at 1930 and 1992 cm.$^{-1}$.

EXAMPLE 7

A solution of 1.85 ml. of nickel carbonyl in 25 ml. of methanol was added dropwise to a warm (40° C.) solution of 4.4 g. of tetrakis(2-cyanoethyl)ethylenediphosphine in 125 ml. of methanol. Carbon monoxide gas was evolved briskly. The mixture was refluxed for thirty minutes after the carbonyl addition was complete and then allowed to cool to room temperature. Fine, cream-colored crystals were formed which were filtered off from the yellow solution, washed thoroughly with ether and dried. Yield of complex was 3.45 g. (57%), M.P. 132–33° C. (decomp.) on a block preheated to 130° C. The infra-red spectrum contained bands at 2000 and 1950 cm.$^{-1}$. Analysis. — Calculated for C$_{16}$H$_{20}$O$_2$N$_4$P$_2$Ni: C, 45.64; H, 4.79. Found C, 45.22; H, 4.93.

Other chelated complexes, for example, dicarbonyltetraphenylethylenediphosphinenickel, dicarbonyltetrabenzylethylenediphosphinenickel, dicarbonyltetratolylethylenediphosphinenickel, dicarbonyltetraethoxyethylenediphosphinenickel, dicarbonyltetraphenoxyethylenediphos-
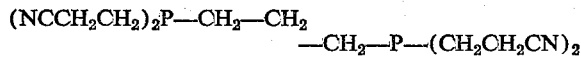

phinenickel, dicarbonyltetrakis(2 - carboethoxyethyl)ethylenediphosphinenickel, dicarbonyltetrakis(2 - carbamoylethyl)ethylenediphosphinenickel, dicarbonyltetrakis(2-cyanoethyl)trimethylenediphosphinenickel, and dicarbonyl - 4 - methyl - ortho - phenylenebis(diethylphosphine)- nickel are prepared by reacting one equivalent of diphosphine with one equivalent of nickel carbonyl in refluxing ether or methanol by procedures identical to that for the preparation of dicarbonyltetrakis(2 - cyanoethyl)ethylenediphosphinenickel and dicarbonyltetraethylethylenediphosphinenickel.

The preparation of linear polymers of acetylene such as those disclosed in my copending application Serial No. 774,152 filed concurrently herewith, is shown in the following examples.

EXAMPLE 8

Pentyne (102 grams, 1.5 moles) and 3 grams (0.006 mole) of $Ni(CO)_2[P(CH_2CH_2CN)_3]_2$ were added to 500 cc. of acetonitrile and the solution was heated at reflux for 6 hours. The color of the solution turned dark brown. The product was insoluble in acetonitrile and precipitated as the solution was cooled. Petroleum ether was added and the solution was extracted with 10% HCl to dissolve the nickel salts and to take up the acetonitrile. The petroleum ether layer was washed with water twice and dried for about 16 hours with $Na_2SO_4$. The petroleum ether was distilled off and the product was distilled under vacuum.

| Fraction | B.P., °C./mm. | Weight, grams |
|---|---|---|
| 1 | 30–50/.4 | 0.5 |
| 2 | 50–75/.4 | 15 |
| 3 | 75–100/.5 | 2.5 |
| 4 | 100–145/.5 | 5.5 |
| 5 | polymer residue | 60 |

*Anaylsis fraction 5.*—M.W. 555.6 (cryoscopic benzene), octamer calculation for $(C_5H_8)_n$. Theory: C, 88.24; H, 11.76. Found: C, 87.94; H, 11.70.

EXAMPLE 9

Heptyne-1 (5.2 g., 0.054 mole) was added to a refluxing solution of 53 cc. acetonitrile containing 0.158 gram $Ni(CO)_2[P(C_2H_4CN)_2CH_2CH_2P(C_2H_4CN)_2]$ (0.000375 mole). The solution was refluxed at 80° C. for 1½ hours. The solution turned dark brown after 25 minutes and then became cloudy as products formed during the course of the reaction. Infra-red analysis of the final reaction mixture showed that 62% of the heptyne had reacted to form a mixture of linear dimer and linear trimer products (product bands at 955, 975 and 895 cm.$^{-1}$).

EXAMPLE 10

Heptyne-1 (5.2 g., 0.054 mole) was added to a refluxing solution of 53 cc. cyclohexane containing 0.15 gram $Ni(CO)_2[P(C_2H_5)_2CH_2CH_2P(C_2H_5)_2]$ (0.00047 mole). The solution was refluxed at 80° C. for 3½ hours. The color of the solution turned dark brown after 25 minutes. Infra-red analysis of the final reaction mixture showed that 24% of the heptyne had reacted to form a mixture of linear dimer and linear trimer products (product bands at 955, 975 and 895 cm.$^{-1}$).

The following table is illustrative of the fact that catalytic activity for the chelated complex with the cyanoethyl group is similar to the catalytic activity of the non-chelated complex containing the cyanoethyl group bonded to the phosphine:

TABLE.—ORDER OF REACTIVITY OF SOME NICKEL-CARBONYL-PHOSPHINE POLYMERIZATION OF HEPTYNE AT $t=40$ (MINUTES AFTER POLYMERIZATION BEGINS)

| Catalyst | Induction Period (min.) | Percent Reaction at $t=40$ min. | Percent Reaction at $t=\infty$ |
|---|---|---|---|
| $Ni(CO)_2[PH(C_2H_4CN)_2]_2$ | 10 | 100 | 100 |
| $Ni(CO)_2[P(C_2H_4CN)_3]_2$ | 15 | 88 | 100 |
| $Ni(CO)_2[P(C_2H_4CN)_2CH_2CH_2P(C_2H_4CN)_2]$ | 13 | 50 | 62 |
| $Ni(CO)_2[P(C_6H_5)_3]_2$ | 34 | 46 | 100 |
| $Ni(CO)_2[PH_2(C_2H_4CN)]_2$ | 5 | 33 | 53 |
| $Ni(CO)_2[PH_2(C_8H_{17})]_2$ | 10 | 30 | 85 |
| $Ni(CO)_2[P(OC_2H_5)_3]_2$ | 25 | 22 | 51 |
| $Ni(CO)_2[P(C_2H_5)_2CH_2CH_2P(C_2H_5)_2]$ | 25 | 18 | 25 |
| $Ni(CO)_2[P(C_4H_9)_3]_2$ | 90 | 8 | 15 |

The above examples are not intended to limit the scope of the chelated complexes of nickel-carbonyl-phosphine catalysts since these chelated complexes are entirely new in the field, and because of their stability and relative ease of preparation they show promise of great commercial value and economic success.

We claim:
1. The compound represented by the formula $Ni(CO)_2[PH(C_2H_4CN)_2]_2$.
2. The compound represented by the formula $Ni(CO_2[P(C_2H_4CN)_3]_2$.
3. The compounds represented by the formula

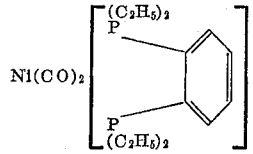

4. The compound represented by the formula $Ni(CO)_2[P(C_2H_4CN)_2CH_2CH_2P(C_2H_4CN)_2]$.
5. The compound represented by the formula $Ni(CO)_2[P(C_2H_5)_2CH_2CH_2P(C_2H_5)_2]$.
6. The compound represented by the formula $Ni(CO)_2[P(C_2H_4CN)_2CH_2CH_2CH_2P(C_2H_4CN)_2]$.
7. Chemical compounds represented by the general formulae selected from the group consisting of $$Ni(CO)_2[PX_2(C_2H_4CN)]_2$$

and $$Ni(CO)_2[R_2PYPR_2]$$

wherein X represents at least one member selected from the group consisting of hydrogen and a cyanoethyl group, R represents at least one member of the group consisting of alkyl, aryl, aralkyl, alkaryl, alkoxy, aryloxy, cyanoalkyl, carboalkoxyalkyl, and carbamoylalkyl groups and Y represents a member of the class consisting of ethylene, trimethylene and orthophenylene groups, wherein the alkyl groups of the alkyl radical-containing members represented by R are lower alkyl groups and the aryl groups of the aryl radical-containing members represented by R are monocyclic aryl groups.

8. The compound represented by the formula $$Ni(CO)_2[PX_2(C_2H_4CN)]_2$$

wherein X represents at least one member selected from the class consisting of hydrogen and a cyanoethyl radical.

9. The compound represented by the formula $$Ni(CO)_2[R_2PYPR_2]$$

wherein R represents at least one member of the class consisting of alkyl, aryl, aralkyl, alkaryl, alkoxy, aryloxy, cyanoalkyl, carboalkoxyalkyl and carbamoylalkyl groups, and Y represents a member of the class consisting of ethylene, trimethylene and orthophenylene groups, wherein the alkyl groups of the alkyl radical-containing members represented by R are lower alkyl groups and the aryl groups of the aryl radical-containing members represented by R are monocyclic aryl groups.

References Cited in the file of this patent
UNITED STATES PATENTS

| | | |
|---|---|---|
| 1,828,560 | Liefde | Oct. 20, 1931 |
| 2,743,264 | Buselli et al. | Apr. 24, 1950 |
| 2,680,758 | Thomas | June 8, 1954 |
| 2,738,364 | Reppe et al. | Mar. 13, 1956 |
| 2,862,945 | Lindstrom et al. | Dec. 2, 1958 |

UNITED STATES PATENT OFFICE
CERTIFICATE OF CORRECTION

Patent No. 3,032,573            May 1, 1962

Lewis S. Meriwether et al.

It is hereby certified that error appears in the above numbered patent requiring correction and that the said Letters Patent should read as corrected below.

Column 1, line 20, the formula should appear as shown below instead of as in the patent:

$$Ni(CO)_2(PR_3)_2$$

Signed and sealed this 25th day of September 1962.

(SEAL)
Attest:

ERNEST W. SWIDER            DAVID L. LADD
Attesting Officer            Commissioner of Patents